UNITED STATES PATENT OFFICE.

HIPPOLYTE S. SUILLIOT AND HENRI DAVID, OF PARIS, FRANCE.

PROCESS OF RENDERING ORGANIC SUBSTANCES INCOMBUSTIBLE.

SPECIFICATION forming part of Letters Patent No. 271,995, dated February 6, 1883.

Application filed February 9, 1882. (No specimens.) Patented in France January 5, 1882, in England January 5, 1882, in Belgium January 5, 1882, and in Germany January 6, 1882.

*To all whom it may concern:*

Be it known that we, HIPPOLYTE SIMON SUILLIOT and HENRI DAVID, both citizens of France, residing at Paris, in the Department of the Seine, Republic of France, have invented a new and useful Composition for Rendering Fabrics, Theatrical Scenery, and other Objects Uninflammable, of which the following is a specification.

Our invention relates to a novel method and means for rendering organic substances—such as textiles or other inflammable or combustible substances—non-inflammable or practically incombustible.

It is well known that the soluble silicates or other soluble salts heretofore employed in fireproofing organic substances, and more especially textiles, upon recrystallization, leave the body of the fabric; or, in other words, they effloresce and after a very short time fall off and leave the substance treated therewith in the inflammable condition it was before being treated with such silicates or other salts. This difficulty has as yet, so far as we are aware, not been overcome, and is the cause of the limited use of such fireproofing materials, and, in fact, their practical abandonment in fireproofing fabrics.

We have discovered that the borates, phosphates, silicates, and tungstates—such as biborate of lime, for example, and other like salts of soluble or even insoluble bases—when combined with saccharine substances, form salts—such as sucro or saccharo borate of lime, or of soda, or potassa, or magnesia, or alumina, or ammonia—that are practically non-crystallizable, and that the saccharine matter is capable of taking up or combining with very large quantities of the salts named. By the combination of these salts with saccharine matter we obtain either a sucro, or saccharo, or melasso, or gluco borate, or tungstate, or silicate, &c., that will render organic substances non-inflammable—in fact, practically incombustible. The saccharine matter having the property of preventing the recrystallization of these salts from the solution, we may say that substances treated with such solutions are rendered permanently fire-proof.

In carrying out our invention, we form a boiling-solution of the salt of from 5° to 15° Baumé, in which the articles to be fireproofed are steeped. This salt may be obtained by taking sugar or molasses or glucose and any one or more of the salts named, in equal proportions, and boiling the same to effect the combination of the salt or salts with the saccharine matter, which may then be crystallized by evaporation, and the salt so obtained is ready for use. We prefer, however, to proceed in a more simple way by preparing a boiling solution of equal parts of the saccharine matter and one or more of the salts named. On cooling we have found that only the excess of the salt, if any, recrystallizes when such solution is very concentrated; but the mother-liquor will yet hold in solution all the salt the saccharine matter used is capable of taking up, or all the salt it is capable of combining with. These saccharine salt solutions are brought to about 10° Baumé, either by evaporation, if too weak, or by addition of saccharine matter, if too strong, and then used for fireproofing organic substances when either hot or cold. For fireproofing textile fabrics we preferably heat the solution to about 30° centigrade, and either paint the surfaces of the fabric or immerse the same in the solution for a sufficiently long time to become impregnated therewith, and when the surfaces are simply painted the solution may be applied cold. It is impossible to state the quantity of the solution to be employed, or the length of time the article is steeped therein, or the number of coats such article is to receive when painted with the solution. These will naturally depend upon the texture of the article treated, upon its thickness, its absorbing qualities, and strength of fiber, and in view of this we can only say that the article treated should remain in the solution a sufficiently long time until said solution has permeated every part thereof, and when painted with the solution it should be applied in successive coats until the same result is attained. As above stated, these salts remain soluble when combined with saccharine matter, and are then practically non-crystallizable after the water of the solution is evaporated. Hence no efflorescence can take place upon the surfaces of the material treated therewith. Under some circumstances we add to the solution an acid—such as boracic, phosphoric, silicic, or tungstic acid in small quantities—to facilitate the solution of the salts and their combination with the saccharine substance used.

Having now described our invention, what we claim is—

The method of rendering organic substances non-inflammable or practically fire-proof, which consists in coating or impregnating the same with a saccharine solution of a salt of a soluble or insoluble base—such as the borates, phosphates, silicates, or tungstates, &c.—as described.

In testimony whereof we affix our signatures in presence of two witnesses.

H. S. SUILLIOT.
      H. DAVID.

Witnesses:
 E. PAGES,
 ROBT. M. HOOPER.